US010007990B2

United States Patent
Mihic et al.

(10) Patent No.: US 10,007,990 B2
(45) Date of Patent: Jun. 26, 2018

(54) GENERATING COMPOSITE IMAGES USING ESTIMATED BLUR KERNEL SIZE

(71) Applicant: Intel Corporation, Santa Clara, CA (US)

(72) Inventors: Bosko Mihic, Novi Sad (RS); Zdravko Pantic, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/757,899

(22) Filed: Dec. 24, 2015

(65) Prior Publication Data

US 2017/0186162 A1 Jun. 29, 2017

(51) Int. Cl.
| | | |
|---|---|---|
| H04N 5/228 | (2006.01) | |
| H04N 5/262 | (2006.01) | |
| H04N 5/217 | (2011.01) | |
| G06T 7/00 | (2017.01) | |
| H04N 5/265 | (2006.01) | |

(52) U.S. Cl.
CPC .......... *G06T 7/0018* (2013.01); *H04N 5/265* (2013.01); *G06T 2207/10016* (2013.01); *G06T 2207/30168* (2013.01)

(58) Field of Classification Search
USPC .......... 382/274, 275, 284; 348/218.1, 36–39, 348/241–251, 208.4, 208.13, 219.1, 348/222.1, 239, 607, 908, 909; 396/322
See application file for complete search history.

(56) References Cited

U.S. PATENT DOCUMENTS

| | | | | |
|---|---|---|---|---|
| 8,194,993 | B1 * | 6/2012 | Chen | G06T 5/006 348/231.6 |
| 9,007,490 | B1 * | 4/2015 | Yuan | G06F 3/005 348/222.1 |
| 2001/0052911 | A1 * | 12/2001 | Boyle | G06F 3/0481 715/763 |
| 2007/0133901 | A1 * | 6/2007 | Aiso | G06T 3/4053 382/294 |
| 2007/0177037 | A1 * | 8/2007 | Kurata | H04N 5/23248 348/241 |
| 2009/0257673 | A1 * | 10/2009 | Schweid | G06K 9/40 382/261 |
| 2010/0272356 | A1 * | 10/2010 | Hong | G06T 7/0002 382/170 |
| 2012/0121202 | A1 | 5/2012 | Wang et al. | |

(Continued)

FOREIGN PATENT DOCUMENTS

WO 2008106282 A1 9/2008

OTHER PUBLICATIONS

PCT International Search Report, PCT Application No. PCT/US2016/057051, dated Jan. 10, 2017, 3 pages.

*Primary Examiner* — Xi Wang
(74) *Attorney, Agent, or Firm* — International IP Law Group, P.L.L.C.

(57) ABSTRACT

An example apparatus includes a kernel size estimator to estimate a blur kernel size of a captured image. The example apparatus also further includes a frame checker to discard the captured image if the estimated blur kernel size of the captured images exceeds a threshold kernel size. The captured image is to be used in a set if the estimated blur kernel size does not exceed the threshold kernel size. The example apparatus further includes a composite generator to generate a composite image based on the set of images.

22 Claims, 8 Drawing Sheets

(56) References Cited

U.S. PATENT DOCUMENTS

| | | | |
|---|---|---|---|
| 2013/0057714 A1* | 3/2013 | Ishii | H04N 5/23248 348/208.4 |
| 2013/0163882 A1* | 6/2013 | Smith | G06T 5/003 382/199 |
| 2014/0003734 A1 | 1/2014 | Umansky et al. | |
| 2015/0063718 A1* | 3/2015 | Mantzel | G06T 5/50 382/274 |
| 2015/0086131 A1* | 3/2015 | Wang | G06T 5/002 382/275 |
| 2015/0110404 A1* | 4/2015 | Cho | G06T 5/003 382/195 |
| 2015/0110415 A1 | 4/2015 | Wang et al. | |

* cited by examiner

400

500

600

700

GENERATING COMPOSITE IMAGES USING ESTIMATED BLUR KERNEL SIZE

BACKGROUND ART

Mobile devices include cameras with relatively simple optics containing few camera elements. However, mobile devices also include increasingly powerful processors that can take advantage of computational photography techniques. For example, using computational photography, a series of photographs can be taken and processed to generate digital panoramas, high-dynamic-range (HDR) images, ultra-low-light images, and three dimensional "light field" images, among other types of images and effects.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
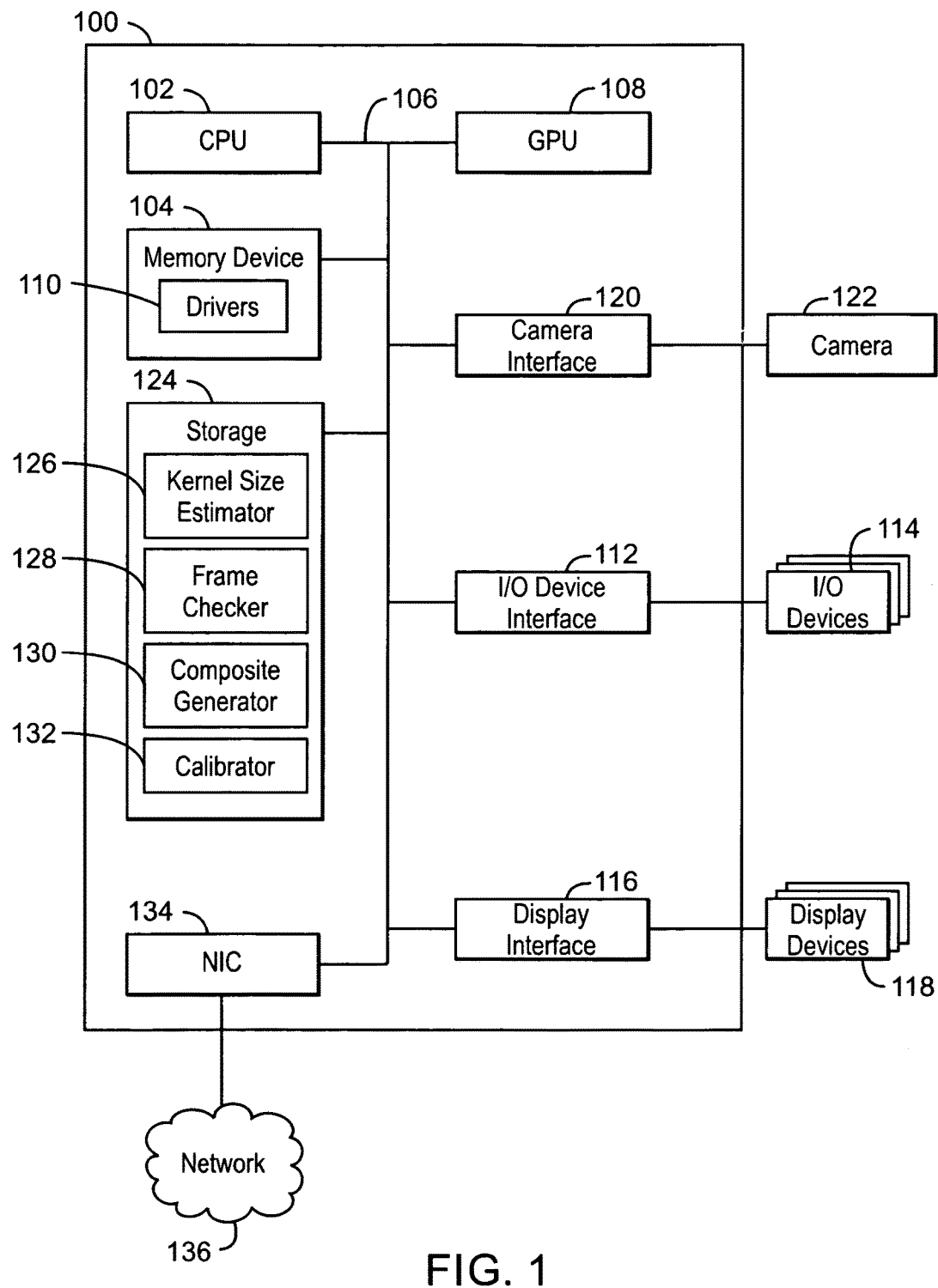
FIG. 1 is block diagram illustrating an example computing device that can be used to estimate blur kernel size.

The present disclosure relates generally to techniques for estimating kernel blur size. Specifically, the techniques described herein include an apparatus, method and system for generating composite images based on estimated kernel blur size. The techniques also include calibrating input devices based on estimated kernel blur size. As discussed above, computational photography utilizes a series of captured images to generate composite images. For example, HDR images can be produced by capturing a series of images at different exposure levels and combining the highlights of underexposed images with the shadows of overexposed images to produce images displaying greater dynamic range. Likewise, digital panoramas can be created by capturing a series of images at different angles and stitching the images together to produce a single panoramic image. Furthermore, ultra-low-light imaging may combine a consecutive series of underexposed images to produce a properly exposed image. However, one or more captured images in a series of captured shots may include motion blur. For example, a camera may use a low sensitivity (ISO) to minimize noise in images. The resulting shutter speed necessary to collect the same amount of light may increase the risk of blur due to shaking or movement of the camera. For example, if aperture is kept constant to maintain a constant depth of field in a photo, then the shutter speed may be decreased to collect additional light and any movement of the camera may result in motion blur. The techniques described herein enable images with motion blur to be detected both reliably and quickly. Thus, blurry frames in a series of consecutive shots can be removed and thus increase the quality of the resulting composite image.

The techniques described herein enable a computing device to detect blur kernel sizes and discard images with blur kernel size above a threshold blur kernel size. For example, where kernel shape is irrelevant to a particular application, the techniques described herein enable a device with a camera to detect images with blur and capture additional images until a threshold number of images is exceeded. In some examples, a composite image can be generated based on the threshold captured number of images. In general, the techniques described herein include a kernel size estimator to estimate blur kernel size and a frame checker to determine whether an image has a blur kernel size above a threshold and discard the image if the image exceeds the threshold. The techniques improve robustness to noise and can be implemented via a simple and efficient implementations.

Further, in some cases, the techniques described herein can also be used to calibrate various input devices, as discussed in more detail below. For example, a calibrator can calibrate input devices based on estimated kernel blur size.

As used herein, a feature is a piece of information relevant for solving a computational task related to a certain application. For example, features can include specific structures in an image such as points, edges or objects. A Haar feature, as used herein, includes featured detected and/or extracting using a Haar filter. A Haarish feature, as used herein, refers to a feature extracted with a modified version of a Haar filter that creates a gap in the middle of the sampling window between non-zero samples of the window array. For example, a Haar function may take the form: Haar(k=5)=0.5*[1, 1, 1, 1, 1, −1, −1, −1, −1, −1] while a Haarish function may take the form: Haarish(k=5, t=3)=0.5*5/3*[1, 1, 1, 0, 0, 0, 0, −1, −1, −1].

Referring now to FIG. 1, a block diagram is shown illustrating an example computing device that can be used to estimate blur kernel size. The computing device 100 may be, for example, a laptop computer, desktop computer, tablet computer, mobile device, or server, among others. The computing device 100 may include a central processing unit (CPU) 102 that is configured to execute stored instructions, as well as a memory device 104 that stores instructions that are executable by the CPU 102. The CPU 102 may be coupled to the memory device 104 by a bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100.

The memory device 104 can include random access memory (RAM), read only memory (ROM), flash memory, or any other suitable memory systems. For example, the memory device 104 may include dynamic random access memory (DRAM). The memory device 104 may include device drivers 110 that are configured to execute the instructions for device discovery. The device drivers 110 may be software, an application program, application code, or the like.

The CPU 102 may also be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100. In some examples, the memory 104 may be communicatively coupled to I/O devices 114 through direct memory access (DMA).

The CPU 102 may also be linked through the bus 106 to a display interface 116 configured to connect the computing device 100 to a display device 118. The display device 118 may include a display screen that is a built-in component of the computing device 100. The display device 118 may also include a computer monitor, television, or projector, among others, that is internal to or externally connected to the computing device 100. The computing device 100 may also include a camera interface 120 configured to connect the computing device 100 to a camera 122.

The computing device also includes a storage device 124. The storage device 124 is a physical memory such as a hard drive, an optical drive, a thumbdrive, an array of drives, or any combinations thereof. The storage device 124 may also include remote storage drives. The storage device 124 includes a kernel size estimator 126, a frame checker 128, a composite generator 130, and a calibrator 132. The kernel size estimator 124 can estimate a blur kernel size of a captured image. For example, the kernel size estimator 124 can estimate the blur kernel size based on a Haar filter. For example, multi-frame captures can use a Haar filter for estimating kernel size. In some examples, blur kernel size can be estimated using both a Haar filter and a Haar-alike filter. In some examples, the kernel size estimator 124 can estimate the blur kernel size based on a Haar-alike filter. In some examples, the kernel size estimator 124 can estimate the blur kernel size in real time. For example, both single frame and multi-frame captures can be processed in real time because data can be buffered from a reference frame and used in real time for consecutive frames. In some examples, the kernel size estimator 124 can estimate the blur kernel size by comparing outputs of different Haar filters for each frame being evaluated. The frame checker 128 can discard the captured image if the estimated blur kernel size of the captured images exceeds a threshold kernel size. The frame checker 128 can use the captured image in a set of images if the estimated blur kernel size does not exceed the threshold kernel size. The composite generator 130 can generate a composite image based on the set of images. For example, the composite image can include an ultra-low-light image, a digital panoramic image, or a high dynamic range (HDR) image. In some examples, the calibrator 132 can calibrate an input device based on the estimated blur kernel size. For example, the input device can be a camera or an accelerometer. In some examples, the image may have been captured in a low light condition. For example, an ultra-low-light image can be generated from a set of images that are underexposed.

The computing device 100 may also include a network interface controller (NIC) 134. The NIC 134 may be configured to connect the computing device 100 through the bus 106 to a network 136. The network 136 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The block diagram of FIG. 1 is not intended to indicate that the computing device 100 is to include all of the components shown in FIG. 1. Rather, the computing system 100 can include fewer or additional components not illustrated in FIG. 1, such as additional engines, additional network interfaces, and the like. The computing device 100 may include any number of additional components not shown in FIG. 1, depending on the details of the specific implementation. Furthermore, any of the functionalities of the CPU 102 may be partially, or entirely, implemented in hardware and/or in a processor. For example, the functionality of the kernel size estimator 126, the frame checker 128, the composite generator 130, and the calibrator 132 may be implemented with an application specific integrated circuit, in logic implemented in a processor, in logic implemented in a specialized graphics processing unit, or in any other device.

Figure 2:
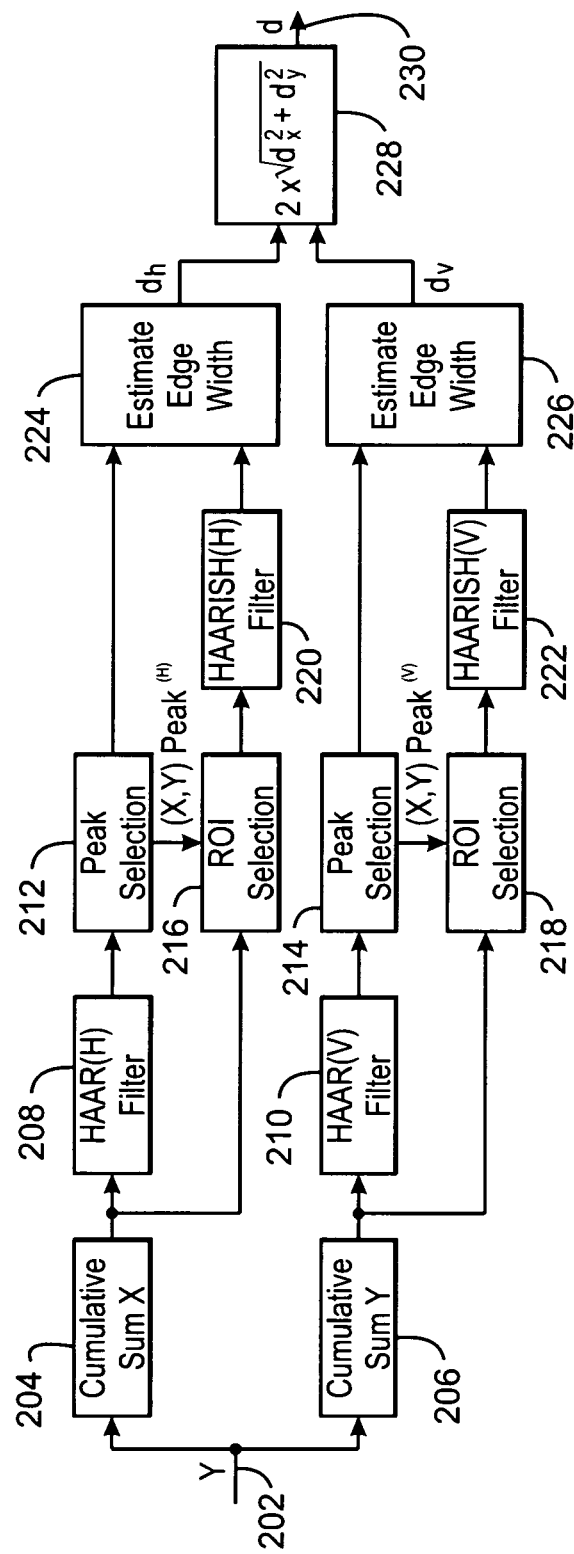
FIG. 2 is a schematic block diagram illustrating a process for estimating a blur kernel size on an initial frame of a sequence.

FIG. 2 is a schematic block diagram illustrating a process for estimating a blur kernel size on an initial frame of a sequence. The example process is referred to generally by the reference number 200 and can be implemented using the computing device 100 of FIG. 1 above. For example, the example process 200 can be performed by the kernel size estimator of FIG. 1 above.

The example process 200 includes receiving an input image 202. At block 204, a cumulative sum is calculated for the X dimension. At block 206, a cumulative sum is calculated for the Y dimension. At block 208, a horizontal Haar filter is applied to the cumulative sum of the X dimension. At block 210, a vertical Haar filter is applied to the cumulative sum of the Y dimension. At block 212, a peak selection is performed on the results of the horizontal Haar filter to produce a horizontal peak coordinate. At block 214, a peak selection is performed on the results of the vertical Haar filter to produce a vertical peak coordinate. At block 216, a region of interest (ROI) is generated based on the cumulative sum of X and the horizontal peak selection coordinates. At block 218, a region of interest (ROI) is generated based on the cumulative sum of Y and the horizontal peak selection coordinates. At block 220, a Haarish filter is applied to the horizontal ROI. At block 222, a Haarish filter is applied to the vertical ROI. At block 224, a horizontal edge width is estimated based on the horizontal peak coordinates and the results of the horizontal Haarish filter. At block 226, a vertical edge width is estimated based on the vertical peak coordinates and the results of the vertical Haarish filter. At block 228, a blur kernel size is estimated based on the estimated horizontal edge width and the estimated vertical edge width. The estimated blur kernel size can be calculated using the equation:

$$2 \times \sqrt{d_x^2 + d_y^2} \qquad \text{(Eq.1)}$$

The estimated blur kernel size is output as indicated by an arrow 230.

The diagram of FIG. 2 is not intended to indicate that the example process 300 is to include all of the components shown in FIG. 2. Rather, the example process 200 can be implemented using fewer or additional components not illustrated in FIG. 2 (e.g., additional filters, sums, etc.).

Figure 3:
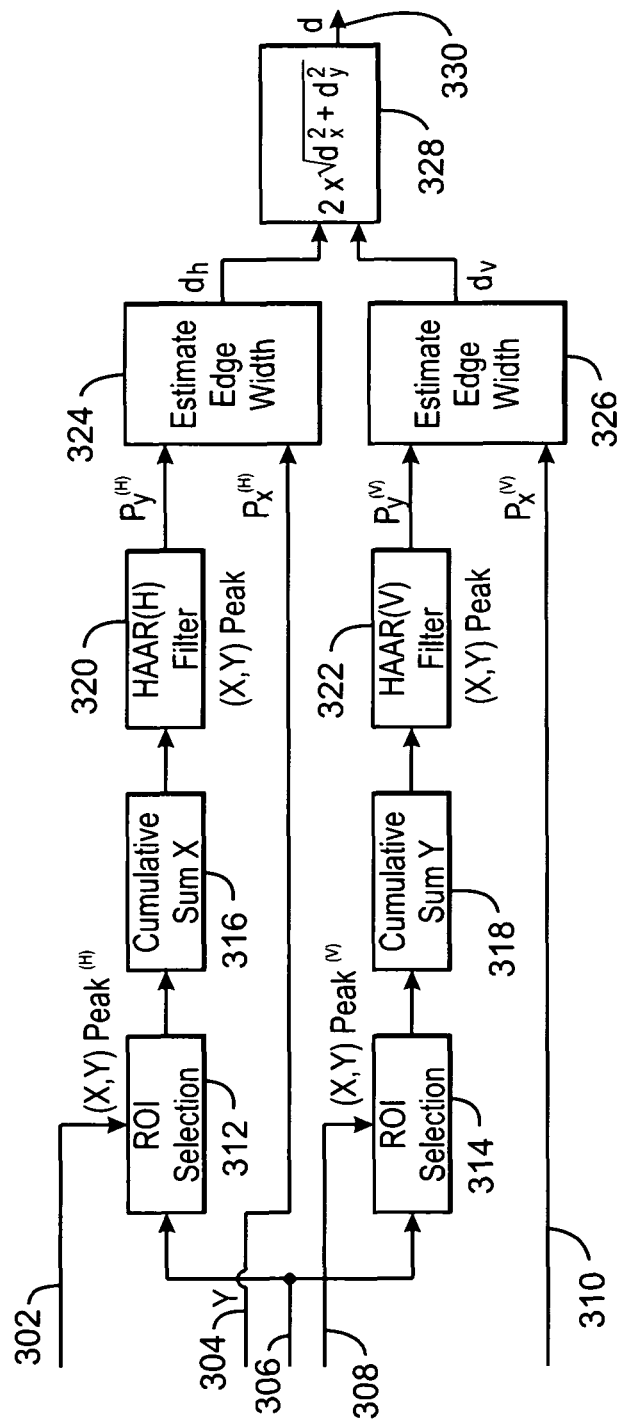
FIG. 3 is a schematic block diagram illustrating a process for estimating a blur kernel size on consecutive frames of a sequence.

FIG. 3 is a schematic block diagram illustrating a process for estimating a blur kernel size on consecutive frames of a sequence. The example process is referred to generally by the reference number 300 and can be implemented using the computing device 100 of FIG. 1 above. For example, the example process 300 can be performed by the kernel size estimator of FIG. 1 above.

The example process 300 is shown receiving five inputs from a previous blur kernel size estimation. For example, the blur kernel size may have been estimated on a previous image in a consecutive series of captured images. For example, a previous blur kernel estimation may have been performed according to the example process 200 described in FIG. 2 above. The five inputs from the previous blur kernel size estimation include a horizontal peak coordinate 302, a horizontal peak value 304, an input image 306, a vertical peak coordinate 308, and a vertical peak value 310. At block 312, a horizontal region of interest (ROI) is selected based on the input image 306 and the horizontal peak coordinate 302. At block 314, a vertical ROI is selected based on the input image 306 and the vertical peak coordinate 308. At block 316, a cumulative sum in the X dimension is calculated. At block 318, a cumulative sum in the Y dimension is calculated. At block 320, a horizontal Haar filter is applied to the cumulative sum in the X dimension. At block 322, a vertical Haar filter is applied to the cumulative sum in the Y dimension. At block 324, a horizontal edge width is estimated based on the filtered horizontal peak and the horizontal peak value 304. At block 326, a vertical edge width is estimated based on the filtered vertical peak and the vertical peak value 310. At block 328, an estimated blur kernel size is calculated based on the estimated horizontal edge width 324 and the estimated vertical edge width 326. For example, the estimated blur kernel size can be calculated using Equation 1 above. The estimated blur kernel size is output as indicated by an arrow 330.

As shown in FIG. 3, calculation of Haar and "Haarish" filter outputs can be realized via the use of the cumulative line sums. Thus, usage of very long filters does not the influence the speed of the execution of the algorithm. Furthermore, the "ROI SELECTION" blocks 312 and 314 select a minimal area needed for performing filtering in the point of interest. Thus, the number of operations for estimating the kernel blur size is additionally reduced.

The diagram of FIG. 3 is not intended to indicate that the example process 300 is to include all of the components shown in FIG. 3. Rather, the example process 300 can be implemented using fewer or additional components not illustrated in FIG. 3 (e.g., additional filters, sums, etc.).

Figure 4:
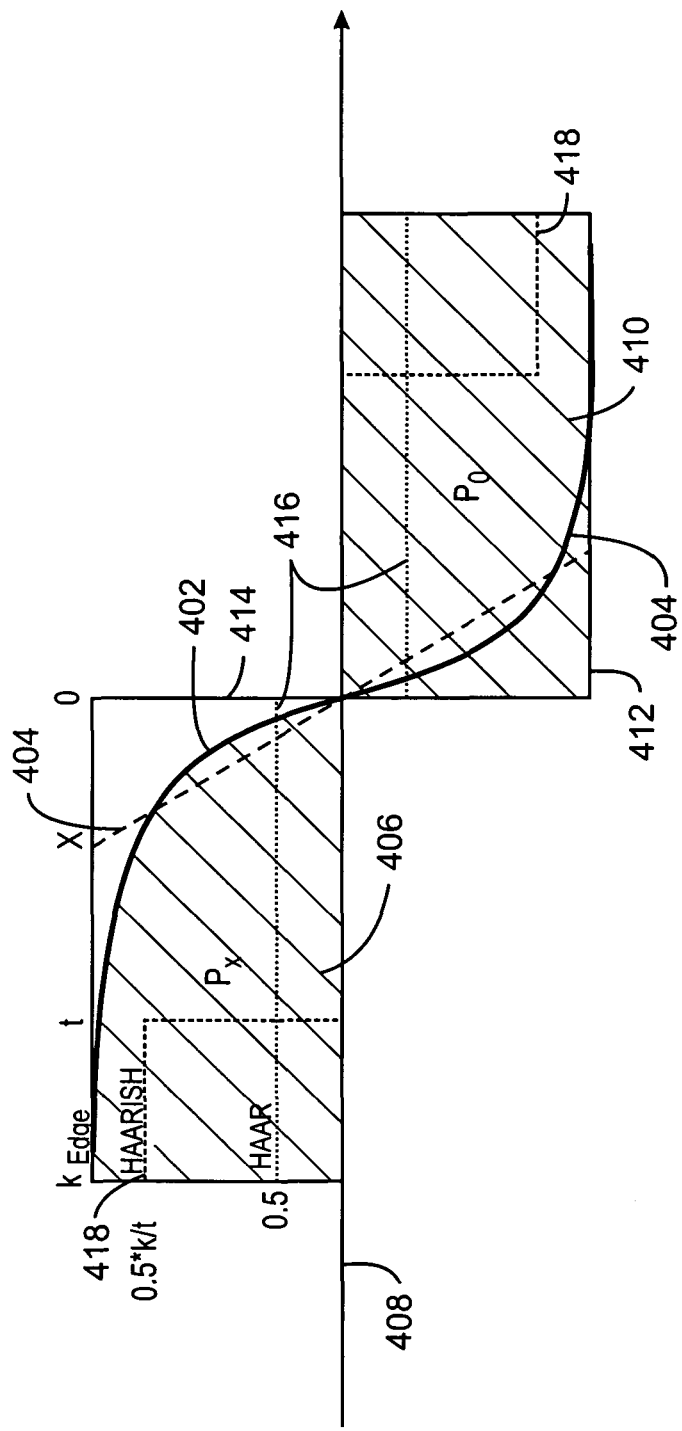
FIG. 4 is a graph illustrating a process for calculating edge width.

FIG. 4 is a graph illustrating a process for calculating edge width. The process is generally referred to by the reference number 400 and can be performed by the computing device 100 of FIG. 1. For example, the process can be performed by the kernel size estimator 126 of FIG. 1.

The graph 400 includes a 2 k pixels long edge curve section 402 and a slope x 404 corresponding to the edge curve section 402. A shaded area 406 corresponds to an area $P_x$ of the graph bound by the edge curve section 402 and the x axis 408. A second shaded area 410 corresponds to an area $P_0$ bound by a line 412, the x axis 208 and the y axis 414. The graph also includes a Haar filter 416 and a Haarish filter 418.

As can be seen in FIG. 4, in order to estimate the slope of the edge, parameter x 404 is determined. For estimating parameter x 404, a ratio between surface $P_x$ 406 and surface $P_0$ 410 is used. The ratio between surface $P_x$ 406 and surface $P_0$ 410 is equivalent to the ratio between Haar and Haarish filter outputs for the point 0. Thus, the parameter x can be calculated using the equations:

$$x = 2k\left(1 - \frac{P_x}{P_0}\right), \text{ if } x < k, \quad \text{(Eq. 2)}$$

$$x = \frac{P_0}{P_x}\frac{k^2}{2k}, \text{ if } x > k. \quad \text{(Eq. 3)}$$

Figure 5:
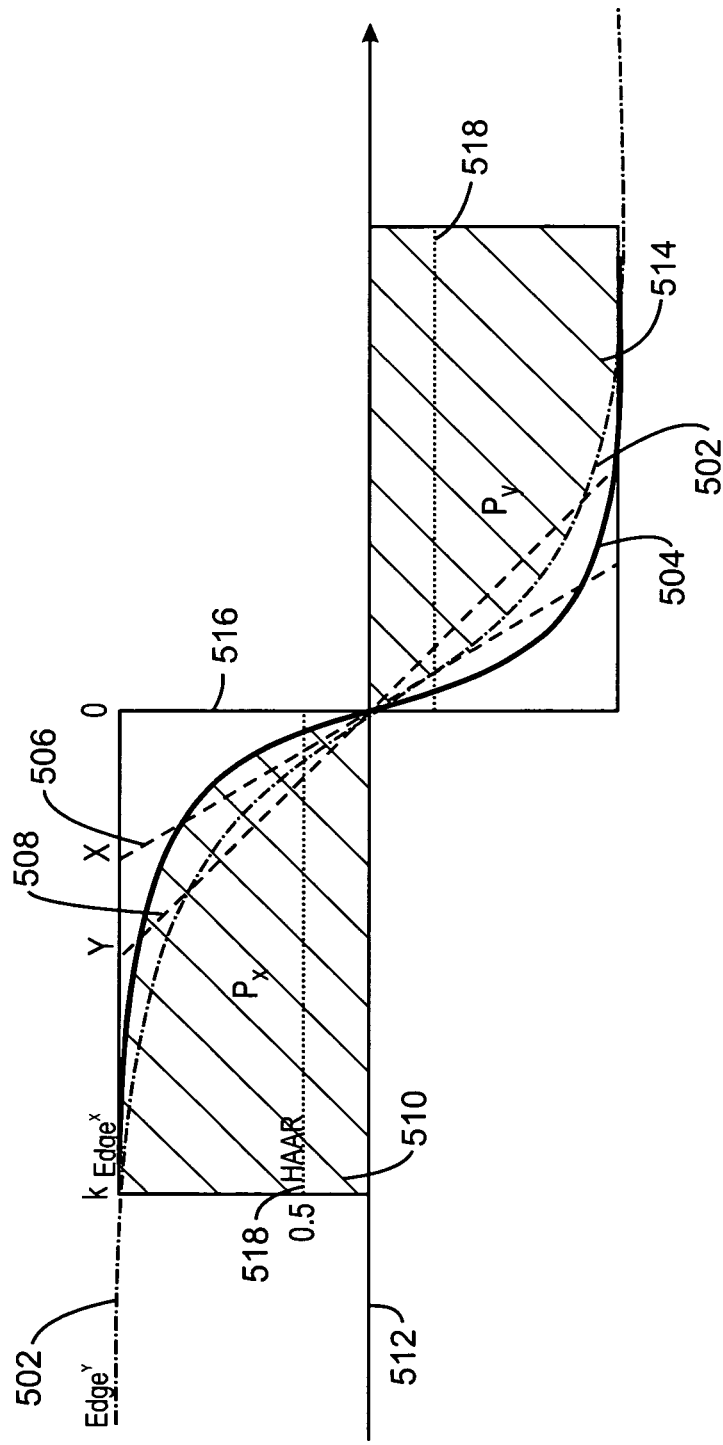
FIG. 5 is a graph illustrating a process for calculating blur width when blur of the same edge is already available.

FIG. 5 is a graph illustrating a process for calculating blur width when blur of the same edge is already available. The example process is generally referred to by the reference number 500 and can be implemented using the computing device 100 of FIG. 1. For example, the process can be performed by the kernel size estimator 126 of FIG. 1.

The graph 500 includes an edge curve 502 in previous frame for which we have already calculated. Haar filter output and an edge curve 504 for the same edge in the current frame. The graph 500 includes a slope x 506 corresponding to the curve 504 and a slope y 508 corresponding to the curve 502. A shaded area 510 corresponds to an area $P_x$ of the graph 500 bound by the edge curve 504 and the x axis 512. A second shaded area 514 corresponds to an area $P_y$ bound by the edge curve 502, the x axis 512 and the y axis 516. The graph also includes a Haar filter 518.

As seen in FIG. 5, if multiple images are available the blur width for a reference image has been calculated, then the blur of consecutive inputs can be obtained even faster by only calculating the output of a Haar filter on the same edge. The following formulas for calculating y are equivalent to the formulas used for calculating x in FIG. 4 above, for x=0:

$$y = 2k - (2k - x)\frac{P_y}{P_x}, \text{ if } x, y < k, \quad \text{(Eq. 4)}$$

$$y = \frac{P_x}{P_y}\frac{k^2}{2k - x}, \text{ if } x < k < y, \quad \text{(Eq. 5)}$$

$$y = \frac{P_x}{P_y}x, \text{ if } k < x, y, \quad \text{(Eq. 6)}$$

$$y = 2k - \frac{P_y}{P_x}\frac{k^2}{x} \text{ if } y < k < x. \quad \text{(Eq. 7)}$$

Figure 6:
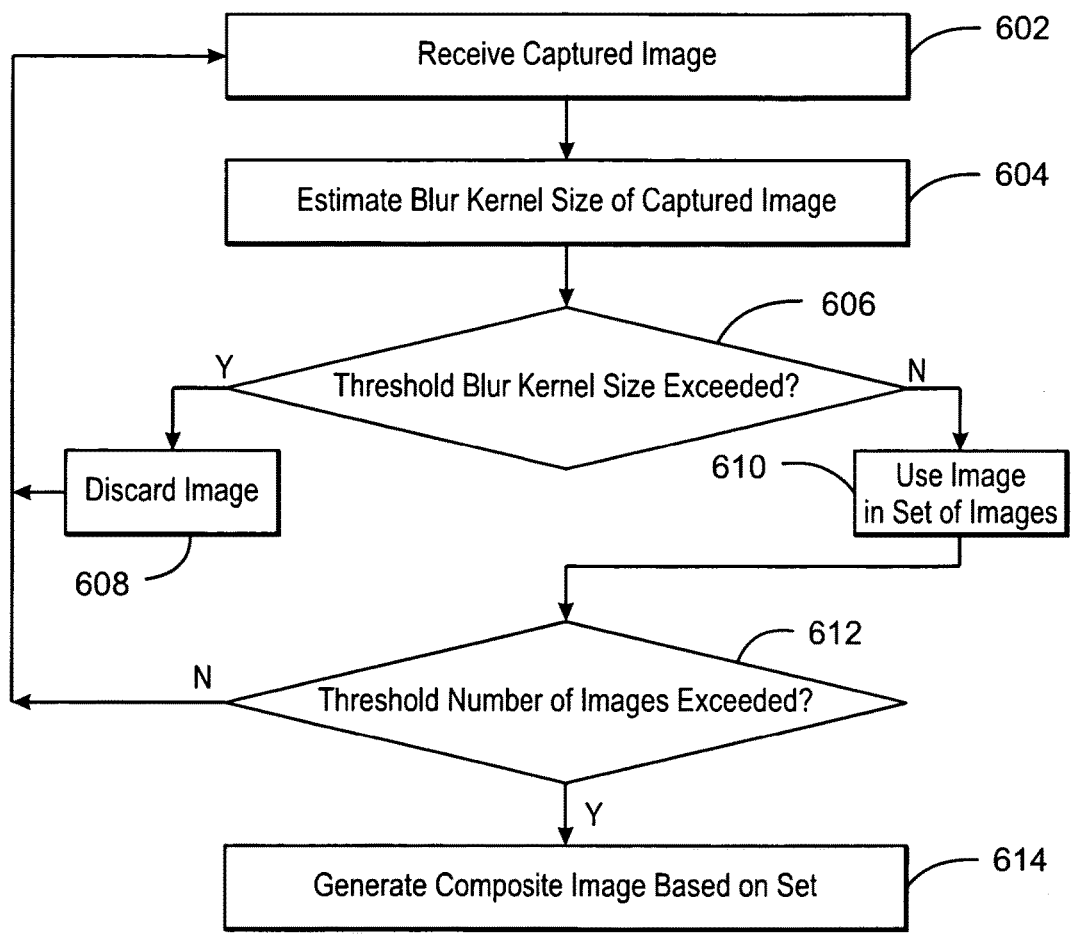
FIG. 6 is a flow chart illustrating a process for generating a composite image based on images having a threshold estimated blur kernel size.

FIG. 6 is a flow chart illustrating a process for generating a composite image based on images having a threshold estimated blur kernel size. The example process is generally referred to by the reference number 600 and can be implemented using the computing device 100 of FIG. 1 above. For example, the process can be performed by the kernel size estimator 126 and the frame checker 128 of FIG. 1.

At block 602, the kernel size estimator receives a captured image. For example, the captured image can be one of a series of consecutively captured images.

At block 604, the kernel size estimator estimates a blur kernel size of captured image. For example, if the captured image is the first image in a sequence, then the kernel size can be estimated as described in FIGS. 2 and 4 above. If the captured image is a consecutive image in a sequence, then the blur kernel size can be estimated more efficiently using the techniques described in FIGS. 3 and 5 above. In some examples, the kernel size estimator can estimate a blur kernel size by comparing outputs of different Haar filters. In some examples, the kernel size estimator can estimate a blur kernel size by using a summed area table. In some examples, the kernel size estimator can estimate a blur kernel size by using a Haarish filter. In some examples, the kernel size estimator can estimate a blur kernel size by detecting a sharpest edge. For example, areas with sharpest edges may be the edges with slope coming only from blur. In some examples, the kernel size estimator can estimate a blur kernel size by using cumulative line sums. In some examples, the kernel size estimator can reuse values from a previous blur kernel size estimation to estimate a blur kernel size of a consecutive image.

At block 606, the frame checker determines whether a threshold blur kernel size is exceeded. If the frame checker detects that the blur kernel size is exceeded, then the method may proceed at block 608. If the frame checker detects that the blur kernel size is not exceeded, then the method may proceed at block 610.

At block 608, the frame checker discards the captured image. For example, the captured image may contain excessive blur and may cause degradation of a composite image if used to generate the composite image.

At block 610, the frame checker uses the captured image in a set of images. For example, the set of images can include one or more consecutively captured images to be used to generate a composite image. In some examples, the process can be pipelined. For example, additional images can be captured while captured images are sent for further processing in parallel.

At block 612, the frame checker determines whether a threshold number of images has been exceeded. If the frame checker detects a number of images saved to the set exceeds a threshold number of images, then the method may proceed at block 614. If the frame checker detects the number of images saved to the set does not exceed the threshold number of images, then the method may proceed at block 602.

At block 614, the computing device generates a composite image based on the set of saved images. For example, the composite image can be an HDR image, a digital panoramic image, a "light field" image, among other composite images.

This process flow diagram is not intended to indicate that the blocks of the example process 600 are to be executed in any particular order, or that all of the blocks are to be included in every case. Further, any number of additional blocks not shown may be included within the example process 600, depending on the details of the specific implementation.

Figure 7:
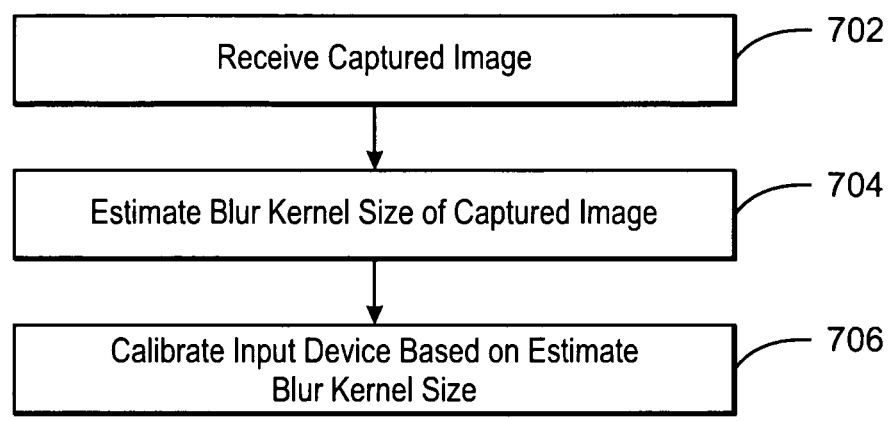
FIG. 7 is a flow chart illustrating a process for calibrating input devices based on estimated blur kernel size.

FIG. 7 is a graph illustrating a process for calibrating input devices based on estimated blur kernel size. The example process is generally referred to by the reference number 700 and can be implemented using the computing device 100 of FIG. 1. For example, the process can be performed by the kernel size estimator 126 and the calibrator 130 of FIG. 1.

At block 702, the kernel size estimator receives a captured image. For example, the captured image can be one of a plurality of a series of consecutively captured images.

At block 704, the kernel size estimator estimates a blur kernel size of the captured image. For example, the blur kernel size can be estimated using the techniques described in FIGS. 2-5 above.

At block 706, the calibrator calibrates an input device based on the estimated blur kernel size. For example, the input device can be a camera, a gyroscope, or an accelerometer. In some examples, the sharpening setting of a camera can be calibrated based on estimated blur kernel size.

This process flow diagram is not intended to indicate that the blocks of the example process 700 are to be executed in any particular order, or that all of the blocks are to be included in every case. Further, any number of additional blocks not shown may be included within the example process 700, depending on the details of the specific implementation.

Figure 8:
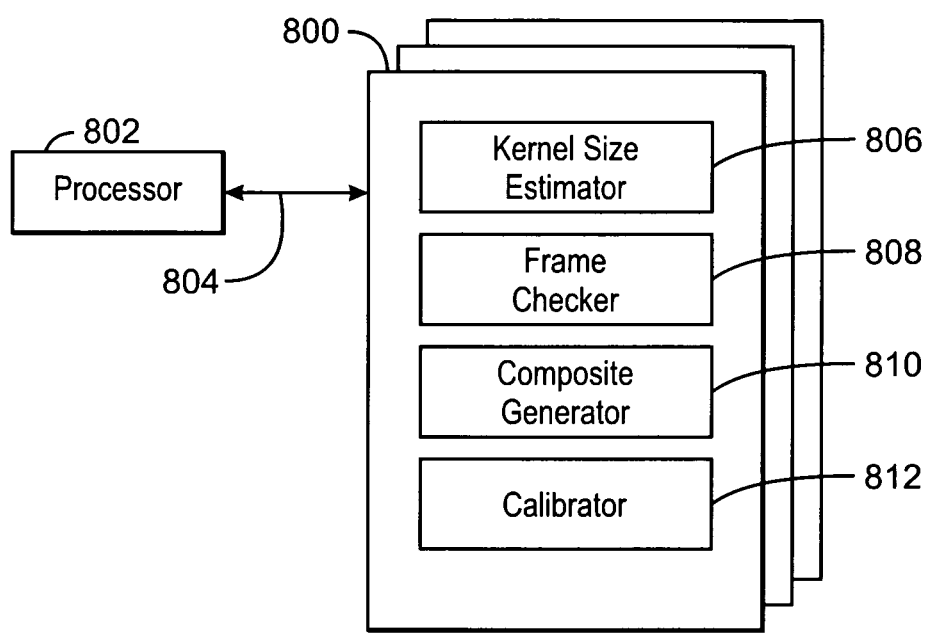
FIG. 8 is a block diagram showing computer readable media that stores code for estimating blur kernel size.

FIG. 8 is a block diagram showing computer readable media 800 that store code for estimating blur kernel size. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media. However, in any case, the computer readable media do not include transitory media such as carrier waves, signals, and the like.

The various software components discussed herein may be stored on one or more computer readable media 800, as indicated in FIG. 8. For example, a kernel size estimator 806 may be configured to estimate a blur kernel size of a captured image. For example, the kernel size estimator 806 may be configured to estimate the blur kernel size based on a Haar filter. In some examples, the kernel size estimator 806 may be configured to estimate the blur kernel size based on a Haar-alike filter. In some examples, the kernel size estimator 806 may be configured to estimate the blur kernel size in real time. In some examples, the kernel size estimator 806 can reuse values from a previous blur kernel size estimation to estimate a blur kernel size of a consecutive image. A frame checker 808 may be configured to discard the captured image if the estimated blur kernel size of the captured images exceeds a threshold kernel size. The frame checker 808 may be configured to use the captured image in a set if the estimated blur kernel size does not exceed the threshold kernel size. A composite generator 810 may be configured to generate a composite image based on the set of captured images. For example, the composite image can include an ultra-low-light image, a digital panoramic image, or a high dynamic range (HDR) image. For example, the composite generator 810 can generate an HDR image from a set of images taken at different exposure levels. In some examples, the composite generator 810 can generate a digital panoramic image from a set of images taken at different angles. In some examples, the image may have been captured in a low light condition. For example, the composite generator 810 may be configured to generate an ultra-low-light image from a set of images that are underexposed. In some examples, a calibrator 812 may be configured to calibrate an input device based on the estimated blur kernel size. For example, the input device can be a camera or an accelerometer. In some examples, the calibrator 812 can calibrate sharpness on a camera based on the estimated blur kernel size.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

EXAMPLES

Example 1 is an apparatus for generating composite images. The apparatus includes a kernel size estimator to estimate a blur kernel size of a captured image. The apparatus also includes a frame checker to discard the captured image if the estimated blur kernel size of the captured images exceeds a threshold kernel size. The captured image is to be used in a set of images if the estimated blur kernel size does not exceed the threshold kernel size. The apparatus further includes a composite generator to generate a composite image based on the set of images.

Example 2 includes the apparatus of example 1, including or excluding optional features. In this example, the kernel size estimator is to estimate the blur kernel size based on a Haar filter.

Example 3 includes the apparatus of any one of examples 1 to 2, including or excluding optional features. In this example, the kernel size estimator is to estimate the blur kernel size based on a Haar filter and a Haarish filter.

Example 4 includes the apparatus of any one of examples 1 to 3, including or excluding optional features. In this example, the kernel size estimator is to estimate the blur kernel size in real time.

Example 5 includes the apparatus of any one of examples 1 to 4, including or excluding optional features. In this example, the kernel size estimator is to estimate the kernel size by comparing outputs of different Haar filters.

Example 6 includes the apparatus of any one of examples 1 to 5, including or excluding optional features. In this example, the apparatus includes a calibrator to calibrate an input device based on the estimated blur kernel size.

Example 7 includes the apparatus of any one of examples 1 to 6, including or excluding optional features. In this example, the composite image is an ultra-low-light image.

Example 8 includes the apparatus of any one of examples 1 to 7, including or excluding optional features. In this example, the composite image is a digital panoramic image.

Example 9 includes the apparatus of any one of examples 1 to 8, including or excluding optional features. In this example, the composite image is a high dynamic range (HDR) image.

Example 10 includes the apparatus of any one of examples 1 to 9, including or excluding optional features. In this example, the image is captured in a low light condition.

Example 11 is a method for generating composite images. The method includes receiving, via a processor, a captured image. The method also includes estimating, via the processor, a blur kernel size of the captured image. The method further includes discarding, via the processor, the captured image in response to detecting that a threshold blur kernel size is exceeded. The method also further includes using, via the processor, the captured image in a set in response to detecting that a threshold blur kernel size is not exceeded. The method also includes generating, via the processor, a composite image based on the set.

Example 12 includes the method of example 11, including or excluding optional features. In this example, estimating the blur kernel size includes comparing outputs of different Haar filters.

Example 13 includes the method of any one of examples 11 to 12, including or excluding optional features. In this example, the method includes reusing, via the processor, values from a previous blur kernel size estimation to estimate a blur kernel size of a consecutive image.

Example 14 includes the method of any one of examples 11 to 13, including or excluding optional features. In this example, the method includes detecting, via the processor, that the set exceeds a threshold number of images and generating the composite image in response to detecting that the set exceeds the threshold number of images.

Example 15 includes the method of any one of examples 11 to 14, including or excluding optional features. In this example, estimating the blur kernel size further includes using a summed area table.

Example 16 includes the method of any one of examples 11 to 15, including or excluding optional features. In this example, estimating the blur kernel size further includes selecting a region of interest.

Example 17 includes the method of any one of examples 11 to 16, including or excluding optional features. In this example, estimating the blur kernel size further includes using a Haarish filter.

Example 18 includes the method of any one of examples 11 to 17, including or excluding optional features. In this example, estimating the blur kernel size further includes detecting a sharpest edge.

Example 19 includes the method of any one of examples 11 to 18, including or excluding optional features. In this example, estimating the blur kernel size further includes using cumulative line sums.

Example 20 includes the method of any one of examples 11 to 19, including or excluding optional features. In this example, the method includes calibrating, via the processor, an input device based on the estimated blur kernel size.

Example 21 is a system for generating composite images. The system includes a camera to capture an image. The system also includes a kernel size estimator to estimate a blur kernel size of the captured image. The system further includes a frame checker to discard or use captured images in a set of images based on a threshold kernel size. The system also further includes a composite generator to generate a composite image based on a set of images.

Example 22 includes the system of example 21, including or excluding optional features. In this example, the kernel size estimator is to estimate the blur kernel size based on a Haar filter.

Example 23 includes the system of any one of examples 21 to 22, including or excluding optional features. In this example, the kernel size estimator is to estimate the blur kernel size based on a Haar filter and a Haarish filter.

Example 24 includes the system of any one of examples 21 to 23, including or excluding optional features. In this example, the system includes a calibrator to calibrate an accelerometer or a gyroscope based on the estimated blur kernel size.

Example 25 includes the system of any one of examples 21 to 24, including or excluding optional features. In this example, the system includes a calibrator to calibrate a camera based on the estimated blur kernel size.

Example 26 includes the system of any one of examples 21 to 25, including or excluding optional features. In this example, the kernel size estimator is to estimate the blur kernel size in real time.

Example 27 includes the system of any one of examples 21 to 26, including or excluding optional features. In this example, the kernel size estimator is to estimate the kernel size by comparing outputs of different Haar filters.

Example 28 includes the system of any one of examples 21 to 27, including or excluding optional features. In this example, the composite image is an ultra-low-light image.

Example 29 includes the system of any one of examples 21 to 28, including or excluding optional features. In this example, the composite image is a digital panoramic image.

Example 30 includes the system of any one of examples 21 to 29, including or excluding optional features. In this example, the composite image is a high dynamic range (HDR) image.

Example 31 is a tangible, non-transitory, computer-readable medium including instructions that, when executed by a processor, direct the processor to generate composite images. The computer-readable medium also includes instructions that direct the processor to estimate a blur kernel size of a captured image. The computer-readable medium further includes instructions that direct the processor to discard the captured image if the estimated blur kernel size of the captured images exceeds a threshold kernel size. The captured image is to be used in a set of images if the blur kernel size does not exceed the threshold kernel size. The computer-readable medium also further includes instructions that direct the processor to generate a composite image based on the set of images.

Example 32 includes the computer-readable medium of example 31, including or excluding optional features. In this example, the computer-readable medium includes instructions to estimate the blur kernel size based on a Haar filter.

Example 33 includes the computer-readable medium of any one of examples 31 to 32, including or excluding optional features. In this example, the computer-readable medium includes instructions to estimate the blur kernel size based on a Haar-alike filter.

Example 34 includes the computer-readable medium of any one of examples 31 to 33, including or excluding optional features. In this example, the computer-readable medium includes instructions to reuse values from a previous blur kernel size estimation to estimate a blur kernel size of a consecutive image.

Example 35 includes the computer-readable medium of any one of examples 31 to 34, including or excluding optional features. In this example, the computer-readable medium includes instructions to calibrate an input device based on the estimated blur kernel size.

Example 36 includes the computer-readable medium of any one of examples 31 to 35, including or excluding optional features. In this example, the computer-readable medium includes instructions to calibrate sharpness on a camera based on the estimated blur kernel size.

Example 37 includes the computer-readable medium of any one of examples 31 to 36, including or excluding optional features. In this example, the computer-readable medium includes instructions to calibrate an accelerometer based on the estimated kernel blur size.

Example 38 includes the computer-readable medium of any one of examples 31 to 37, including or excluding optional features. In this example, the computer-readable medium includes instructions to generate a digital panoramic image from a set of images taken at different angles.

Example 39 includes the computer-readable medium of any one of examples 31 to 38, including or excluding optional features. In this example, the computer-readable medium includes instructions to generate an HDR image from a set of images taken at different exposure levels.

Example 40 includes the computer-readable medium of any one of examples 31 to 39, including or excluding optional features. In this example, the computer-readable medium includes instructions to generate an ultra-low-light image from a set of images that are underexposed.

Example 41 is a system for generating composite images. The system includes means for capturing an image. The system also includes means for estimating a blur kernel size of the captured image. The system further includes means for discarding or using captured images in a set of images based on a threshold kernel size. The system also further includes means for generating a composite image based on a set of images.

Example 42 includes the system of example 41, including or excluding optional features. In this example, the means for estimating a blur kernel size is to estimate the blur kernel size based on a Haar filter.

Example 43 includes the system of any one of examples 41 to 42, including or excluding optional features. In this example, the means for estimating a blur kernel size is to estimate the blur kernel size based on a Haar filter and a Haarish filter.

Example 44 includes the system of any one of examples 41 to 43, including or excluding optional features. In this example, the system includes means for calibrating an accelerometer or a gyroscope based on the estimated blur kernel size.

Example 45 includes the system of any one of examples 41 to 44, including or excluding optional features. In this example, the system includes means for calibrating a camera based on the estimated blur kernel size.

Example 46 includes the system of any one of examples 41 to 45, including or excluding optional features. In this example, the means for estimating a blur kernel size is to estimate the blur kernel size in real time.

Example 47 includes the system of any one of examples 41 to 46, including or excluding optional features. In this example, the means for estimating a blur kernel size is to estimate the kernel size by comparing outputs of different Haar filters.

Example 48 includes the system of any one of examples 41 to 47, including or excluding optional features. In this example, the composite image includes an ultra-low-light image.

Example 49 includes the system of any one of examples 41 to 48, including or excluding optional features. In this example, the composite image includes a digital panoramic image.

Example 50 includes the system of any one of examples 41 to 49, including or excluding optional features. In this example, the composite image includes a high dynamic range (HDR) image.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for generating composite images, comprising a processor to:
   estimate a blur kernel size of a captured image using a Haarish filter comprising a modified Haar filter that creates a gap in the middle of a sampling window between non-zero samples of a window array;
   discard the captured image if the estimated blur kernel size of the captured image exceeds a threshold kernel size, wherein the captured image is to be used in a set of images if the estimated blur kernel size does not exceed the threshold kernel size; and
   generate a composite image based on the set of images comprising the captured image.

2. The apparatus of claim 1, wherein the processor is to estimate the blur kernel size also using a Haar filter.

3. The apparatus of claim 1, wherein the processor is to estimate the blur kernel size in real time.

4. The apparatus of claim 1, wherein the processor is to estimate the kernel size of the captured image by also comparing outputs of different Haar filters.

5. The apparatus of claim 1, wherein the processor is to calibrate an external input device based on the estimated blur kernel size.

6. The apparatus of claim 1, wherein the composite image comprises an ultra-low-light image.

7. The apparatus of claim 1, wherein the composite image comprises a digital panoramic image.

8. The apparatus of claim 1, wherein the composite image comprises a high dynamic range (HDR) image.

9. The apparatus of claim 1, wherein the image is captured in a low light condition.

10. A method for generating composite images, comprising:
    receiving, via a processor, a captured image;
    estimating, via the processor, a blur kernel size of the captured image using a Haarish filter comprising a modified Haar filter that creates a gap in the middle of a sampling window between non-zero samples of a window array;
    discarding, via the processor, the captured image in response to detecting that the estimate blur kernel size exceeds a threshold blur kernel size;
    using, via the processor, the captured image in a set in response to detecting that the estimate blur kernel size does not exceed the threshold blur kernel size; and
    generating, via the processor, a composite image based on the set comprising the captured image.

11. The method of claim 10, wherein estimating the blur kernel size comprises comparing outputs of different Haar filters.

12. The method of claim 10, further comprising reusing, via the processor, values from a previous blur kernel size estimation to estimate a blur kernel size of a consecutive image.

13. The method of claim 10, further comprising detecting, via the processor, that the set exceeds a threshold number of images and generating the composite image in response to detecting that the set exceeds the threshold number of images.

14. The method of claim 10, wherein estimating the blur kernel size further comprises using a summed area table.

15. The method of claim 10, wherein estimating the blur kernel size further comprises selecting a region of interest.

16. The method of claim 10, wherein estimating the blur kernel size further comprises detecting a sharpest edge.

17. The method of claim 10, wherein estimating the blur kernel size further comprises using cumulative line sums.

18. The method of claim 10, further comprising calibrating, via the processor, an input device based on the estimated blur kernel size.

19. A system for generating composite images, comprising:
    a camera to capture an image; and
    a processor to:
      estimate a blur kernel size of the captured image based on a Haarish filter comprising a modified Haar filter that creates a gap in the middle of a sampling window between non-zero samples of a window array;
      discard or use captured images in a set of images based on the estimated blur kernel size exceeding or not exceeding a threshold kernel size, respectively; and
      generate a composite image based on the set of images comprising the captured image.

20. The system of claim 19, wherein the processor is to estimate the blur kernel size further based on a Haar filter.

21. The system of claim 19, comprising an accelerometer or a gyroscope, wherein the processor is to calibrate the accelerometer or the gyroscope based on the estimated blur kernel size.

22. The system of claim 19, comprising a camera, wherein the processor is to calibrate the camera based on the estimated blur kernel size.

* * * * *